US012451650B2

(12) United States Patent
Maeba et al.

(10) Patent No.: US 12,451,650 B2
(45) Date of Patent: Oct. 21, 2025

(54) ELECTRICAL CONNECTOR AND ELECTRICAL CONNECTOR ASSEMBLY

(71) Applicant: TYCO ELECTRONICS JAPAN G.K., Kawasaki (JP)

(72) Inventors: Kosuke Maeba, Tokyo (JP); Tomoha Goto, Tokyo (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 358 days.

(21) Appl. No.: 17/715,189

(22) Filed: Apr. 7, 2022

(65) Prior Publication Data

US 2022/0329011 A1 Oct. 13, 2022

(30) Foreign Application Priority Data

Apr. 13, 2021 (JP) ................................ 2021-067588

(51) Int. Cl.
*H01R 13/631* (2006.01)
*H02K 5/22* (2006.01)

(52) U.S. Cl.
CPC ....... *H01R 13/631* (2013.01); *H01R 2201/10* (2013.01); *H02K 5/225* (2013.01)

(58) Field of Classification Search
USPC ................................................. 439/374, 378
See application file for complete search history.

(56) References Cited

U.S. PATENT DOCUMENTS 5,605,150 A 2/1997 Radons et al.
5,629,574 A 5/1997 Cognetti et al.
5,658,165 A 8/1997 Yokota
5,741,164 A 4/1998 Yasuno et al.
6,322,389 B1 * 11/2001 Reese ................ H01R 13/6315 439/553
6,371,790 B1 * 4/2002 Huang ............... H01R 13/6453 439/378

(Continued)

FOREIGN PATENT DOCUMENTS

| | | |
|---|---|---|
| CN | 1140918 A | 1/1997 |
| CN | 2711935 Y | 7/2005 |

(Continued)

OTHER PUBLICATIONS

Office Action for corresponding JP Application No. 2021067588 dated Jul. 22, 2024 (9 pages).

(Continued)

*Primary Examiner* — Ross N Gushi

(57) ABSTRACT

An electrical connector (1) includes: a housing (60); at least one contact (20) that is housed in a housing hole (64) including the body (63) of the housing, and extends in a predetermined direction from the housing body (63); and a guide (65) that is disposed contiguously to the housing body (63), and extends from the housing in the predetermined direction. The size of a portion of the guide (65), extending from the housing body (63), is greater than the size of a portion of the contact (20), extending from the housing body (63). The electrical connector (1) is mated with a mating electrical connector and prevents positional deviation between contacts in a pair, which are mated to each other, in a case in which such connectors are connected while being mated to each other.

18 Claims, 11 Drawing Sheets

(56) References Cited

U.S. PATENT DOCUMENTS

| | | | | |
|---|---|---|---|---|
| 7,187,099 | B1 | 3/2007 | Morimatsu et al. | |
| 7,670,177 | B2 * | 3/2010 | Myer | H01R 13/4365<br>439/595 |
| 8,753,141 | B2 | 6/2014 | Randolph et al. | |
| 9,373,904 | B2 * | 6/2016 | Binner | H01R 12/71 |
| 2001/0012718 | A1 | 8/2001 | Nishimatsu | |
| 2007/0141908 | A1 | 6/2007 | Bert et al. | |
| 2020/0203870 | A1 | 6/2020 | Yin et al. | |

FOREIGN PATENT DOCUMENTS

| | | | |
|---|---|---|---|
| EP | 2083485 | A2 | 7/2009 |
| JP | H0818094 | A | 7/1996 |
| JP | H08273774 | A | 10/1996 |
| JP | H08339914 | A | 12/1996 |
| JP | 2001223057 | A | 8/2001 |
| JP | 2003185048 | A | 7/2003 |
| JP | 2016048981 | A | 4/2016 |
| JP | 2017228460 | A | 12/2017 |
| JP | 2018022628 | A | 2/2018 |
| KR | 960027081 | A | 7/1996 |

OTHER PUBLICATIONS

Office Action for corresponding JP Application No. 2021067588 dated Oct. 6, 2024 (10 pages).

* cited by examiner

FIG. 3A
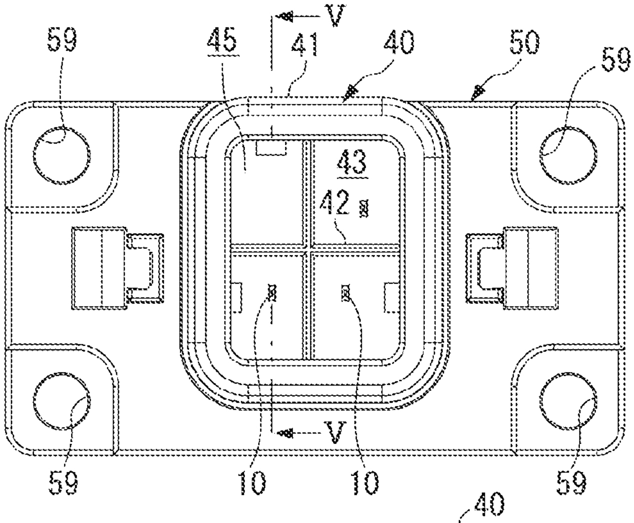
FIG. 3D
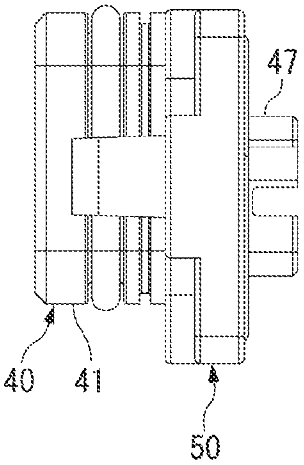
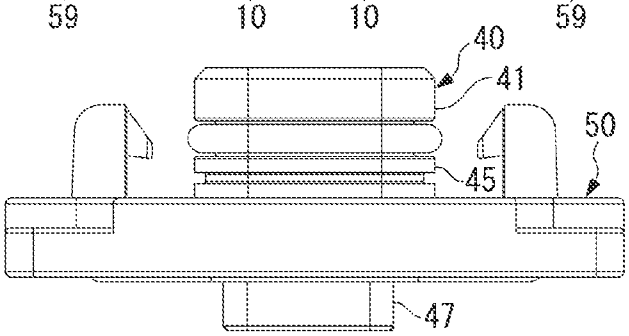
FIG. 3B
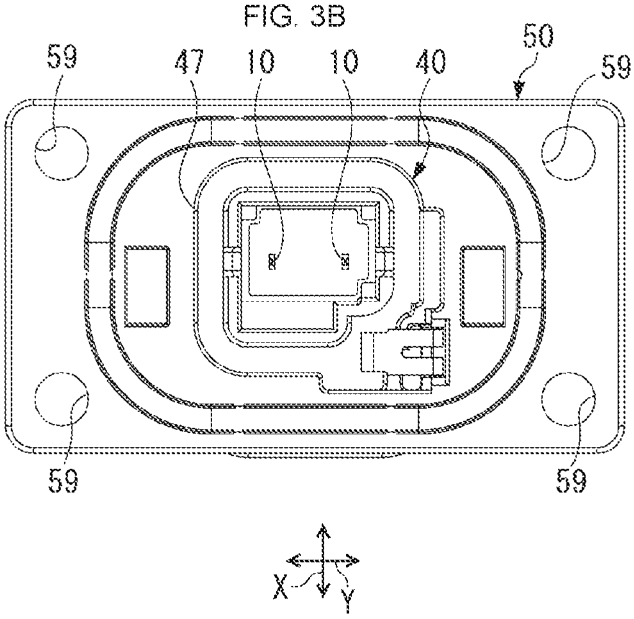
FIG. 3C

ELECTRICAL CONNECTOR AND ELECTRICAL CONNECTOR ASSEMBLY

CROSS REFERENCE TO RELATED APPLICATIONS

This application claims priority to JP Application No. 2021-067588, filed 13 Apr. 2021, the subject matter of which is herein incorporated by reference in its entirety.

BACKGROUND OF THE INVENTION

The subject matter herein relates generally to an electrical connector by which contacts in a pair can be mated to each other with high precision without causing a positional deviation.

JP2016-48981A describes a motor including an electrical connector that enables the number of components and man-hours for assembly to be reduced in a case in which a cable and a circuit board closer to the motor are connected to each other. The electrical connector includes a first connector and a second connector that can be mated to each other. The first connector includes: a first terminal (contact); a first-terminal retention member that houses and retains the first terminal; and a first shell that is attached to the outside of the first-terminal retention member. The second connector includes: a second terminal (contact) that can be connected to the first terminal; a second-terminal retention member that houses and retains the second terminal; and a second shell that is attached to the outside of the second-terminal retention member.

When a positional deviation of contacts in a pair with respect to each other occurs in a case in which connectors in a pair are connected while being mated to each other, the mating may become impossible, and damage, such as buckling, to one or both of the contacts in a pair may occur.

A need remains for an electrical connector and an electrical connector assembly, in which a positional deviation between contacts in a pair, which are mated to each other, can be prevented in a case in which such connectors are connected while being mated to each other.

BRIEF DESCRIPTION OF THE INVENTION

In one embodiment, an electrical connector is provided including a housing, at least one contact that is housed in a housing hole including a body of the housing, and extends in a predetermined direction from the housing body, and a guide that is disposed contiguously to the housing body, and extends from the housing in the predetermined direction. A size of a portion of the guide in the invention, extending from the housing body, is greater than a size of a portion of the contact, extending from the housing body.

In various embodiments, the guide may include a tapered tip portion and a body portion that is linked to the tip section, and has a constant cross sectional area, and may have a size of a portion of only the body portion, extending from the housing, is greater than the size of the portion of the contact, extending from the housing.

In various embodiments, the housing may have a crosswise direction and a longitudinal direction that are each orthogonal to the predetermined direction. The guide may include one or both of a crosswise element that prevents a positional deviation in the crosswise direction and a longitudinal element that prevents a positional deviation in the longitudinal direction.

In various embodiments, the contact may includes a fixation portion that is housed in the housing and a loose-fit portion that is positioned at a predetermined spacing from the housing where the fixation portion is disposed in an end of the contact, opposite to the predetermined direction.

In various embodiments, the tab-type contact may include a two-layer connecting end that is mated to a receptacle-type mating contact in a mating side, and is formed by bending a metal plate and an elastic portion that is linked to the connecting end, and is formed of a one-layer metal plate, and the elastic portion includes an S-shaped bent region.

In another embodiment, the electrical connector assembly is provided including the electrical connector and a mating electrical connector that is connected to the electrical connector.

In a further embodiment, a mating electrical connector is provided including a mating contact that is electrically connected to the contact of the electrical connector and a mating housing that retains the mating contact. The mating housing includes a guide passage through which the guide of the electrical connector is guided.

In various embodiment, the size of the portion of the guide, extending from the housing body, is greater than the size of the portion of the contact, extending from the housing body. Accordingly, when the electrical connector is connected to the mating connector, the guide is guided to the mating housing prior to the contact, the contact is thus aligned with respect to the mating contact, and therefore, the contact is smoothly inserted and mated into the mating contact.

BRIEF DESCRIPTION OF THE DRAWINGS

FIG. 2(*b*) is a front view of the electrical connector in accordance with an exemplary embodiment.

FIG. 2(*c*) is a rear view of the electrical connector in accordance with an exemplary embodiment.

FIG. 2(*d*) is a left side view of the electrical connector in accordance with an exemplary embodiment.

FIG. 2(*e*) is a right side view of the electrical connector in accordance with an exemplary embodiment.

FIG. 3(*a*) is a top view of a portion of the electrical connector showing an upper housing and an attachment flange in accordance with an exemplary embodiment.

FIG. 3(*b*) is a front view of a portion of the electrical connector showing the upper housing and the attachment flange in accordance with an exemplary embodiment.

FIG. 3(*c*) is a rear view of a portion of the electrical connector showing the upper housing and the attachment flange in accordance with an exemplary embodiment.

FIG. 3(*d*) is a side view of a portion of the electrical connector showing the upper housing and the attachment flange in accordance with an exemplary embodiment.

FIG. 4(*b*) is a front view of a portion of the electrical connector showing the lower housing in accordance with an exemplary embodiment.

FIG. 4(*c*) is a rear view of a portion of the electrical connector showing the lower housing in accordance with an exemplary embodiment.

FIG. 4(*d*) is a side view of a portion of the electrical connector showing the lower housing in accordance with an exemplary embodiment.

FIG. 4(*e*) is a bottom view of a portion of the electrical connector showing the lower housing in accordance with an exemplary embodiment.

FIG. 6(*b*) is a side view of the contact of the electrical connector in accordance with an exemplary embodiment.

FIG. 6(*c*) is a top view of the contact of the electrical connector in accordance with an exemplary embodiment.

FIG. 6(*d*) is a bottom view of the contact of the electrical connector in accordance with an exemplary embodiment.

FIG. 7(*b*) is a front view of the mating connector for the electrical connector in accordance with an exemplary embodiment.

FIG. 7(*c*) is a bottom view of the mating connector for the electrical connector in accordance with an exemplary embodiment.

FIG. 7(*d*) is a view of the mating connector taken along the arrow d-d in FIG. 7(*a*).

FIG. 11(*b*) is a partial cross sectional view illustrating the electrical connector partially mated to the mating connector.

FIG. 11(*c*) is a partial cross sectional view illustrating the electrical connector mated to the mating connector.

DETAILED DESCRIPTION OF THE INVENTION

Figure 1A:
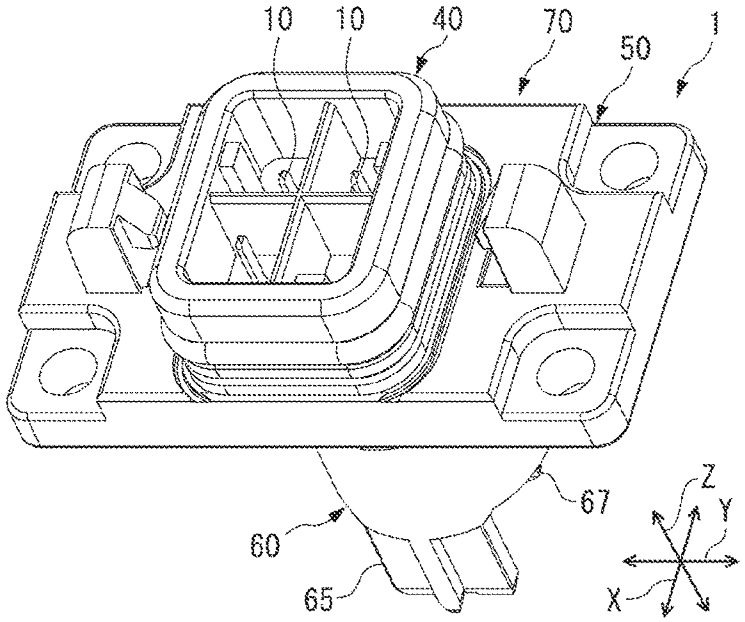
FIG. 1 is an isometric view illustrating an electrical connector in accordance with an exemplary embodiment and a mating connector for the electrical connector.
Figure 1B:
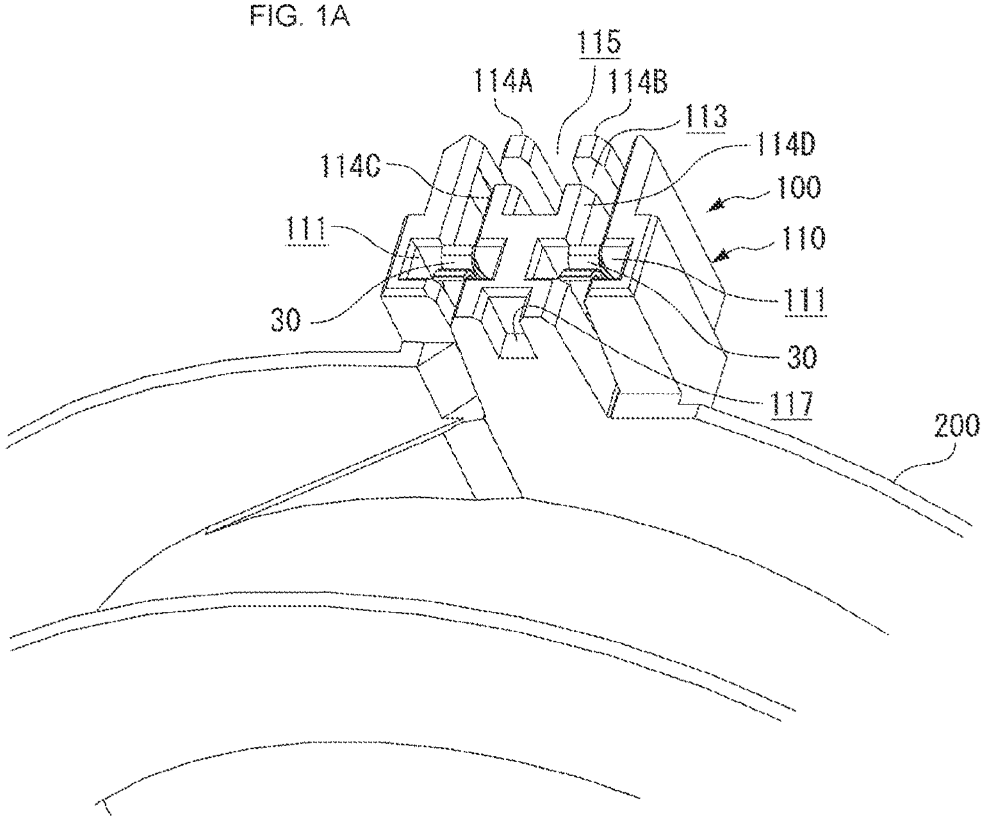
Figure 9:
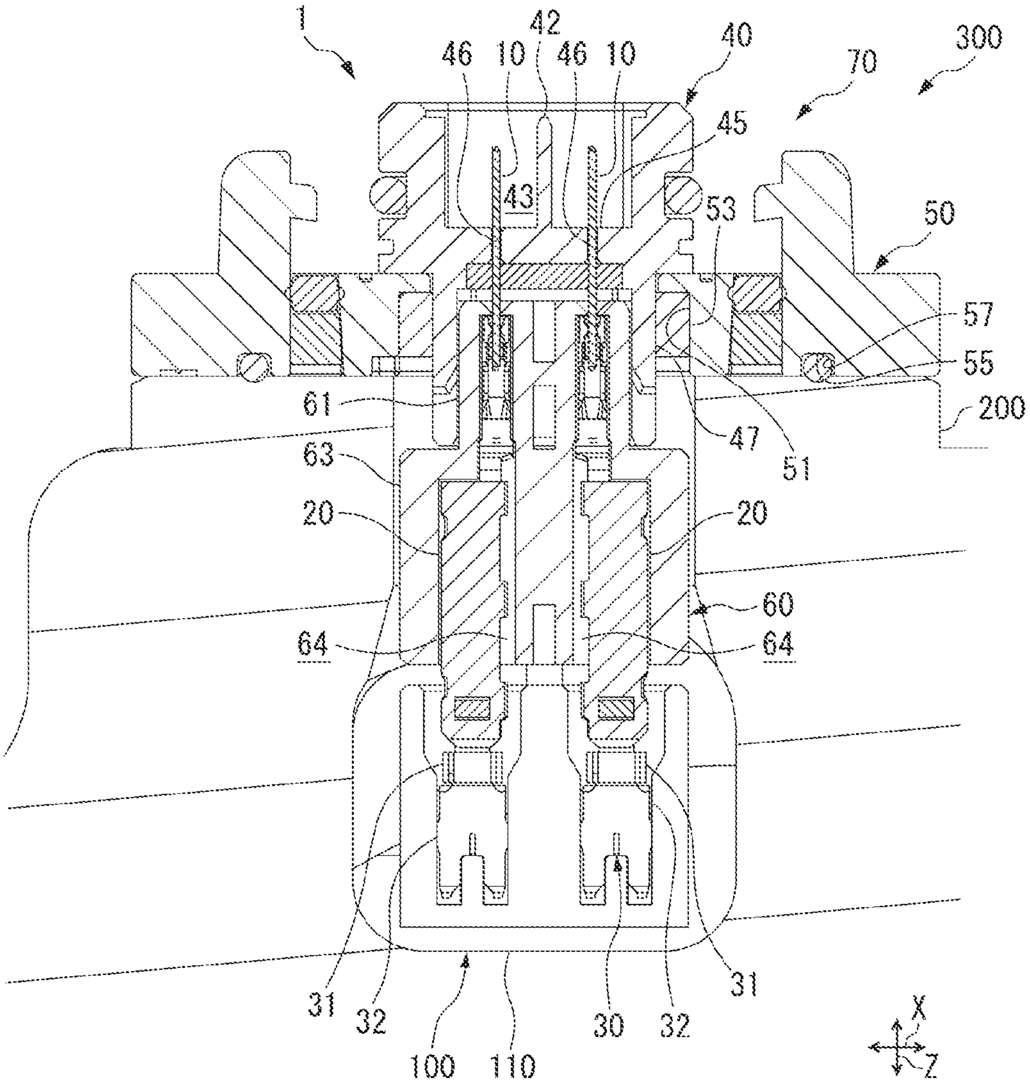
FIG. 9 is a cross sectional view taken along the arrow IX-IX in FIG. 8.
Figure 10:
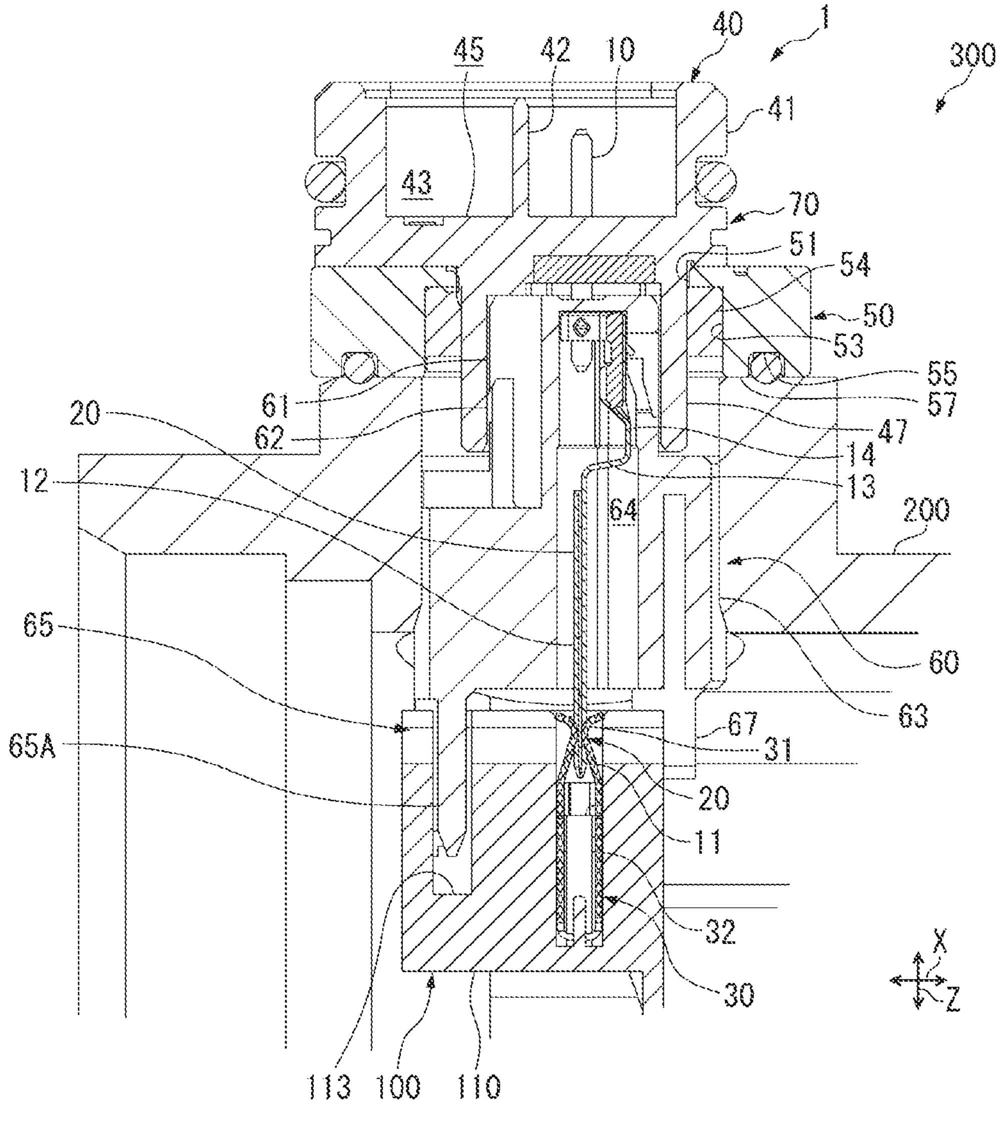
FIG. 10 is a cross sectional view taken along the arrow X-X in FIG. 8.

FIG. 1 is an isometric view illustrating an electrical connector 1 in accordance with an exemplary embodiment and a mating connector 100 for the electrical connector 1. The electrical connector 1 is a male-type electrical connector and the mating electrical connector 100 is a female-type electrical connector, to thereby form an electrical connector assembly 300 (FIGS. 9 and 10). The mating electrical connector 100 is disposed on an object to be applied 200, for example, an electric motor.

Figure 5:
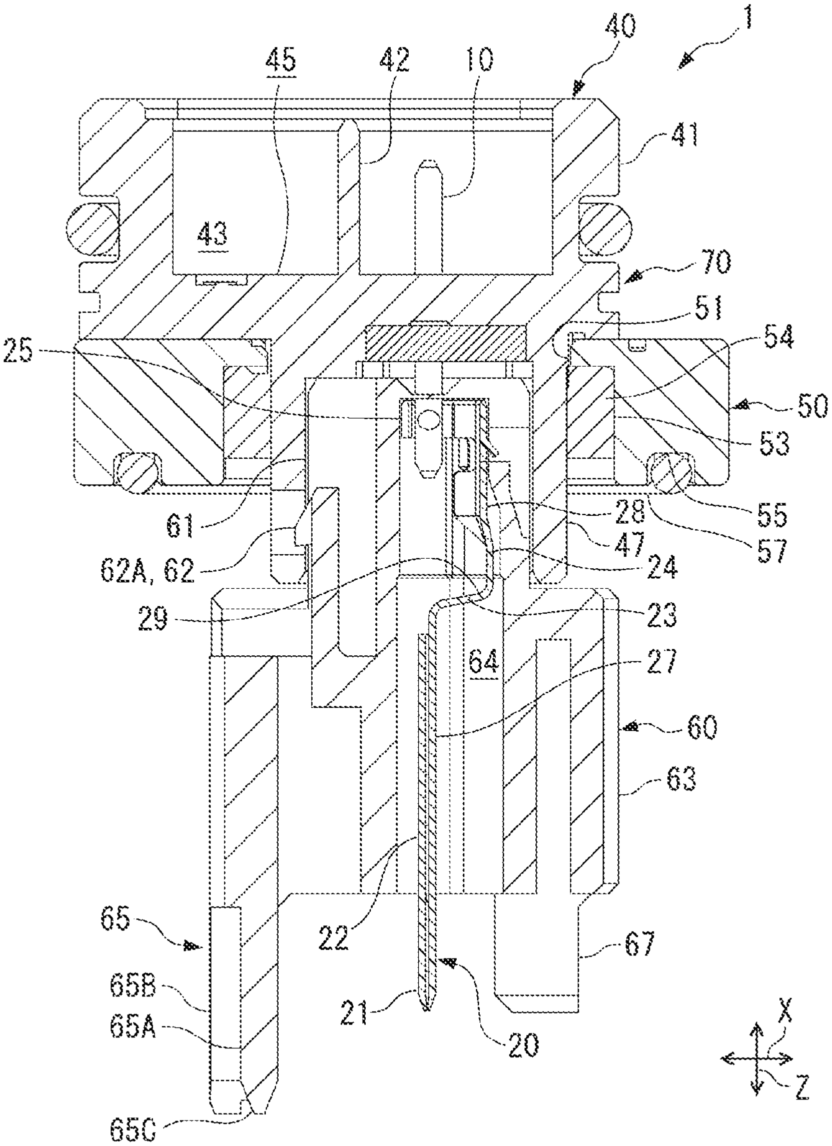
FIG. 5 is a cross sectional view of the electrical connector in accordance with an exemplary embodiment taken along the arrow V-V in FIG. 3.

As illustrated in FIGS. 1, 5, and 9, the electrical connector 1 includes: a plurality of, for example, two first tab-type contacts 10 that are mated to the mating electrical connector 100; second contacts 20 that are electrically connected to the two first contacts 10, respectively; and a connector housing 70 that houses and retains the first contacts 10 and the second contacts 20.

In the electrical connector 1, a longitudinal direction X, a crosswise direction Y, and a height direction Z are set to be specified, as illustrated in FIG. 1.

[Connector Housing 70: FIGS. 2 to 5, and 9]

The connector housing 70 that retains the first contacts 10 will now be described. The connector housing 70 includes a first guide 65 that is received by the mating electrical connector 100 prior to the first contacts 10 when the first contacts 10 are mutually mated to the third receptacle-type contacts 30 of the mating electrical connector 100. The first guide 65 is disposed in a lower housing 60 described below.

Figures 2A, 2B, 2C, 2D, 2E:
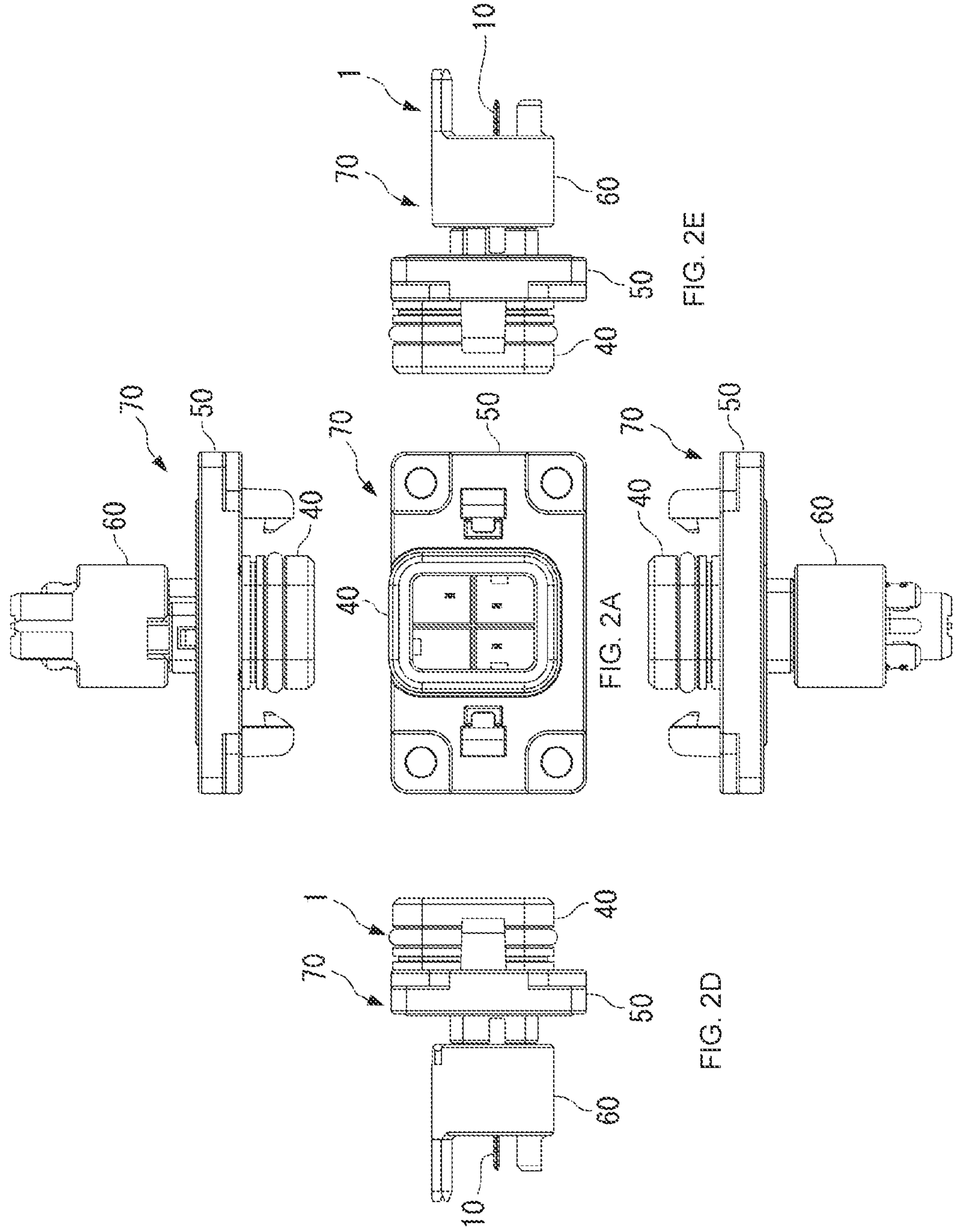
FIG. 2(*a*) is a top view of the electrical connector in accordance with an exemplary embodiment.
Figure 4B:
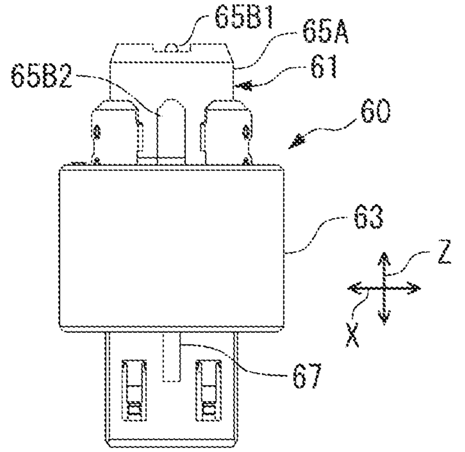
FIG. 4(*a*) is a top view of a portion of the electrical connector showing a lower housing in accordance with an exemplary embodiment.
Figure 4A:
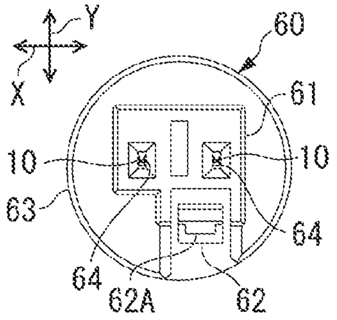
Figure 4D:
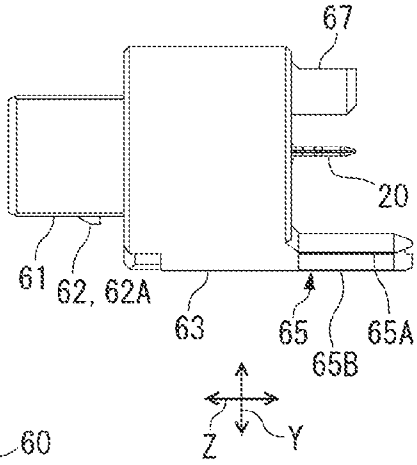
Figure 4C:
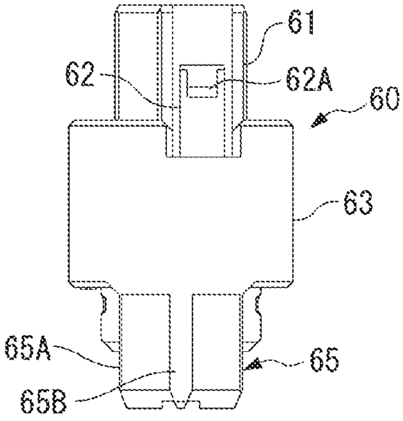
Figure 4E:
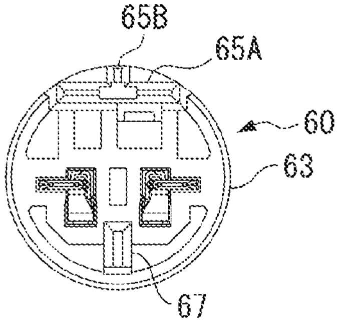

The electrical connector 1 is illustrated in FIGS. 2, 5, and 9. As illustrated in FIGS. 2 and 5, the connector housing 70 includes: an upper housing 40; an attachment flange 50 that supports the upper housing 40; and the lower housing 60 that matches with the upper housing 40 via the attachment flange 50. The upper housing 40, the attachment flange 50, and the lower housing 60 are formed integrally with each other by injection-molding a resin material.

The upper housing 40 is illustrated in FIGS. 3, 5, and 9. The upper housing 40 is mated to the mating electrical connector 100 via the attachment flange 50 and the lower housing 60 while retaining the first contacts 10.

As illustrated in FIGS. 3 and 5, the upper housing 40 includes: an outer wall 41 that defines the periphery of the upper housing 40; and a contact housing chamber 43 that is disposed on the inside of the outer wall 41. The contact housing chamber 43 is partitioned into four sections by a cross-shaped partition 42 in planar view. In addition, the upper housing 40 includes: a bottom floor 45 that partitions a lower portion of the contact housing chamber 43; and a connection cylinder 47 that extends from the bottom surface of the bottom floor 45. The lower housing 60 is mated to a gap in the connection cylinder 47 while the attachment flange 50 is mated to the outer periphery of the connection cylinder 47, as illustrated in FIG. 5.

The first contacts 10 penetrates and is retained by the bottom floor 45. Therefore, contact supporting holes 46 are formed to penetrate the bottom floor 45 in the height direction Z of the bottom floor 45, as illustrated in FIG. 9. In various embodiments, the two first contacts 10 and the two contact supporting holes 46 are formed as an example.

The attachment flange 50 is illustrated in FIGS. 3, 5, and 9. The attachment flange 50 is integrally connected to the upper housing 40 by mating the attachment flange 50 to the outer periphery of the connection cylinder 47 of the upper housing 40, as illustrated in FIGS. 3 and 5. In addition, the attachment flange 50 allows the upper housing 40 and the lower housing 60 described below to be fixed to the object to be applied 200 by attaching the attachment flange 50 to the object to be applied 200 with, for example, a bolt of which illustration is omitted, as illustrated in FIG. 9.

As illustrated in FIGS. 3 and 5, the attachment flange 50 is an element having a rectangular plate shape in planar view, and includes; a retaining hole 51 that penetrates from the front to back of the attachment flange 50 in the generally central portion in the crosswise direction Y of the attachment flange 50; and an elastic support 53 that is disposed between the attachment flange 50 and the connection cylinder 47 in the retaining hole 51. The connection cylinder 47 of the upper housing 40 is positioned to penetrate the retaining hole 51, whereby the connection cylinder 47, i.e., the upper housing 40 is supported on the attachment flange 50.

The attachment flange 50 includes: a housing groove 55 that is formed in an annular shape in the lower surface thereof in the figure; and a seal ring 57 that is housed and retained in the housing groove 55. The seal ring 57 seals an area between the attachment flange 50 and the object to be applied 200 by press of the seal ring 57 against the object to be applied 200, caused by fixation of the attachment flange 50 to the object to be applied 200, as illustrated in FIG. 9.

The lower housing 60 is illustrated in FIGS. 4, 5, and 9. The lower housing 60 is connected to the upper housing 40 and the attachment flange 50 via the connection cylinder 47, as illustrated in FIG. 5. In the connection, the connection cylinder 47 is disposed between the attachment flange 50 and the lower housing 60.

The lower housing 60 includes: a housed body 61 that is housed and retained in the connection cylinder 47; and a body 63 that is linked to the housed body 61, as illustrated in FIGS. 4 and 9. Contact housing holes 64 lying in rows in the height direction Z are formed in the housed body 61 and the body 63. Moreover, a lock bar 62 that plays a role in preventing the lower housing 60 from falling out of the connection cylinder 47 is formed on the upper surface of the body 63. A locking pawl 62A is disposed on the upper end of the lock bar 62. In addition, the lower housing 60 includes: the first guide 65 that is linked to the body 63, and extends toward the lower side in the figure; and a second guide 67 that is disposed at a spacing from the first guide 65 in the longitudinal direction X, and extends toward the lower side in the figure.

When the first contacts 10 and a mating housing 110 are connected to each other, the first guide 65 are received in the mating housing 110 before the second contacts 20 are received by the third contacts 30, to thereby guide the second contacts 20 to the third contacts 30.

As illustrated in FIGS. 4(*d*) and 5, the leading end of the first guide 65 is located at a farther position from the body 63 than the leading ends of the second contacts 20. In other words, the size of a portion of the first guide 65, extending from the lower housing 60, is greater than the sizes of portions of the second contacts 20, extending from the lower housing 60. The positional relationship between the leading ends of the first guide 65 and the second contacts 20 enables insertion of the second contacts 20 into the third contacts 30 to be guided without causing the positional deviations of the second contacts 20, as described in detail below.

The first guide 65 includes a tapered tip portion 65C, and a body portion linked to the tapered tip portion 65C has a constant cross sectional area. Thus, the first guide 65 can be stably moved into a first guide passage 113 and a second guide passage 115. Moreover, the size of a portion of only the body portion of the first guide 65, extending from the body 63 of the lower housing 60, is greater than the sizes of portions of the second contacts 20, extending from the body 63 of the lower housing 60. The body portion linked to the tapered tip portion 65C includes a first element 65A and a second element 65B, described later.

The first guide 65 includes: the first element 65A that is formed to have a large width in the longitudinal direction X; and the second element 65B that is disposed contiguously to the center of the first element 65A in the longitudinal direction X, and is formed to have a considerably smaller width than the first element 65A. The first element 65A is inserted into the mating housing 110, and thus plays a role in guiding in the longitudinal direction X. The second element 65B is inserted into the mating housing 110, and thus plays a role in guiding in the crosswise direction Y. In other words, the first element 65A is an example of the longitudinal element of the invention, preventing a positional deviation in the longitudinal direction X, while the second element 65B is an example of the crosswise element of the invention, preventing a positional deviation in the crosswise direction Y. In connection between the electrical connector 1 and the mating electrical connector 100, the first element 65A is inserted into the first guide passage 113 of the mating housing 110, described later, and the second element 65B is inserted into the second guide passage 115 of the mating housing 110.

The second guide 67 is disposed across the second contacts 20 from the first guide 65 in the longitudinal direction X, as illustrated in FIGS. 4(*b*), 4(*d*), 4(*e*), and 9. The size of a portion of the second guide 67, extending from the lower housing 60, is less than the size of the portion of the first guide 65, extending from the lower housing 60, and is equivalent to the sizes of the portions of the second contacts 20, extending from the lower housing 60.

The second guide 67 is inserted into the third guide passage 117 of the mating housing 110, described later, to thereby prevent a positional deviation in a process in which the second contacts 20 and the third contacts 30 are mated to each other.

The first contact 10 is illustrated in FIGS. 5 and 9. As illustrated in FIGS. 5 and 9, the first tab-type contacts 10 penetrate the bottom floor 45 of the upper housing 40, and are retained in the bottom floor 45. The portions of the first contacts 10 above the bottom floor 45 in the height direction Z are housed in the contact housing chamber 43, while the portions of the first contacts 10 below the bottom floor 45 in the height direction Z are housed in the connection cylinder 47. The first contacts 10 enter the interior of the lower housing 60 in the connection cylinder 47.

The first contacts 10 are formed based on shearing workability by stamping an electrically conductive metal plate such as copper or copper alloy.

Figure 6A:
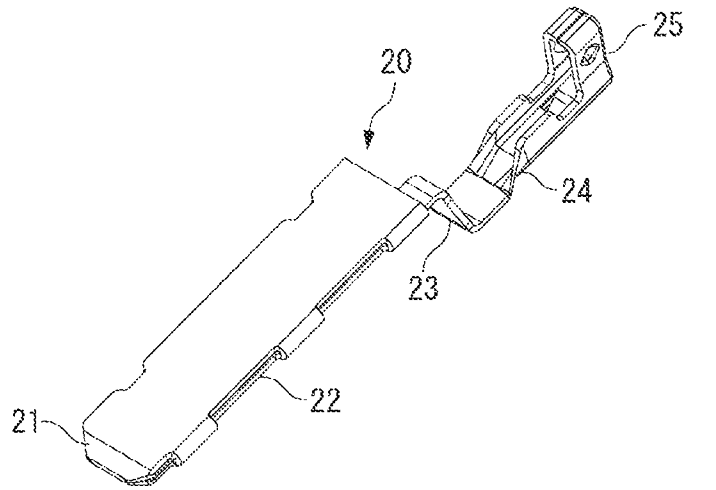
FIG. 6(*a*) is an isometric view of a contact of the electrical connector in accordance with an exemplary embodiment.
Figures 6B, 6C, 6D:
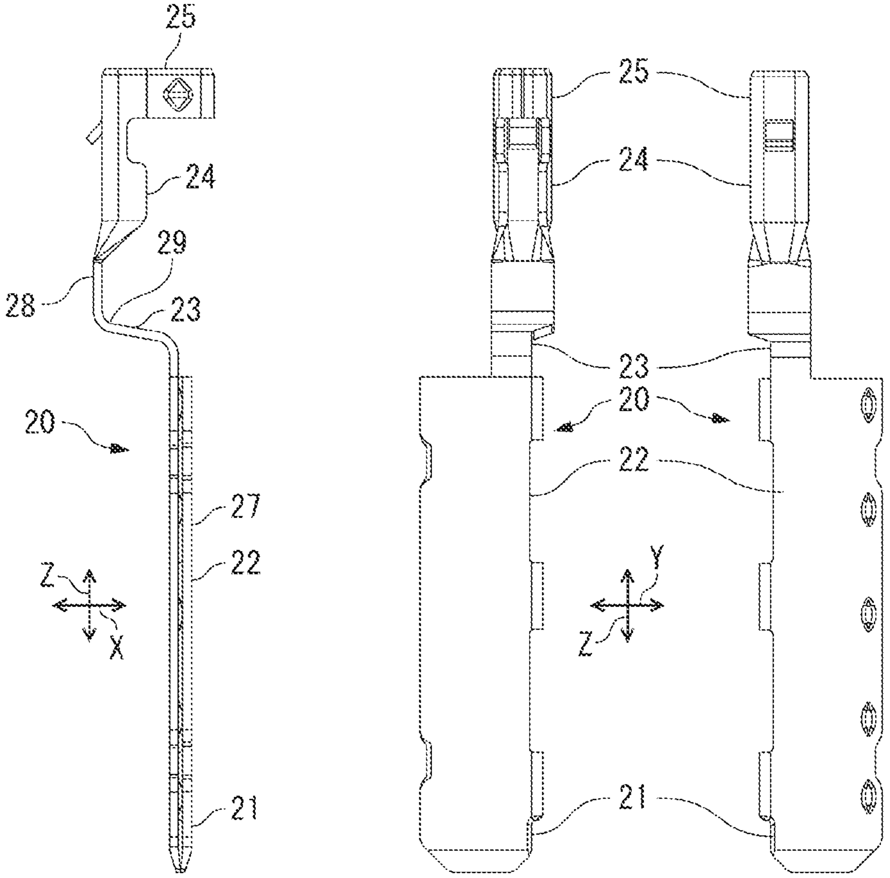
Figure 7A:
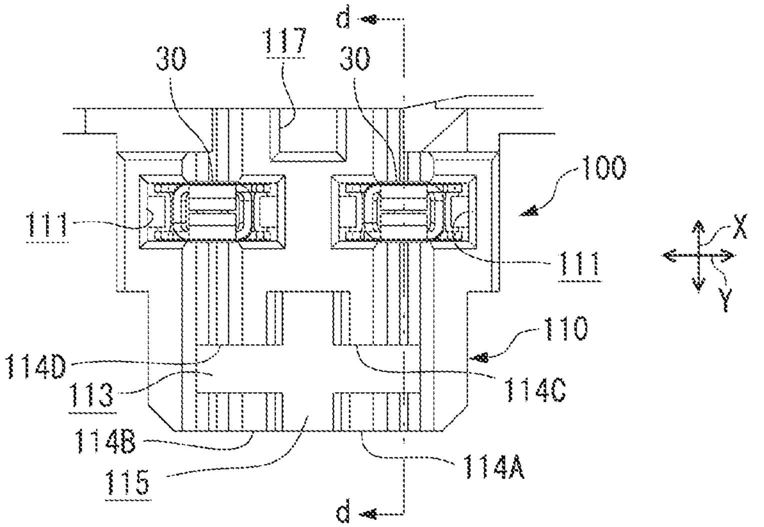
FIG. 7(*a*) is a top view of a mating connector for the electrical connector in accordance with an exemplary embodiment.
Figure 7B:
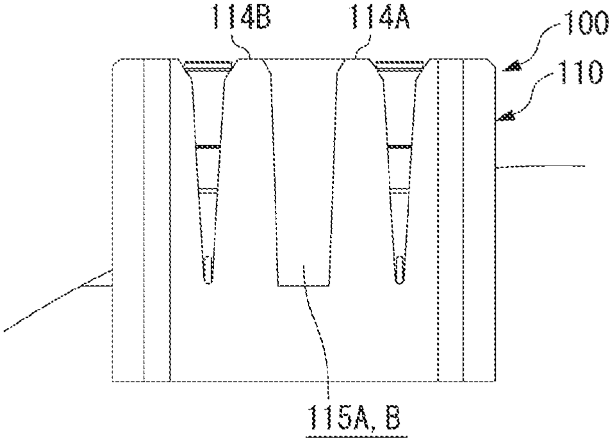
Figure 7D:
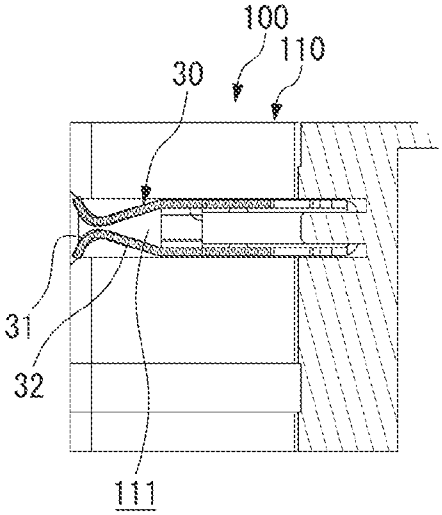
Figure 7C:
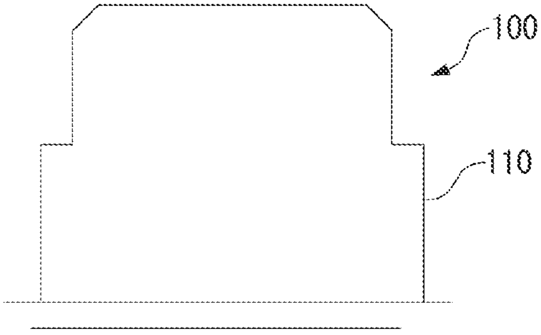
Figure 8:
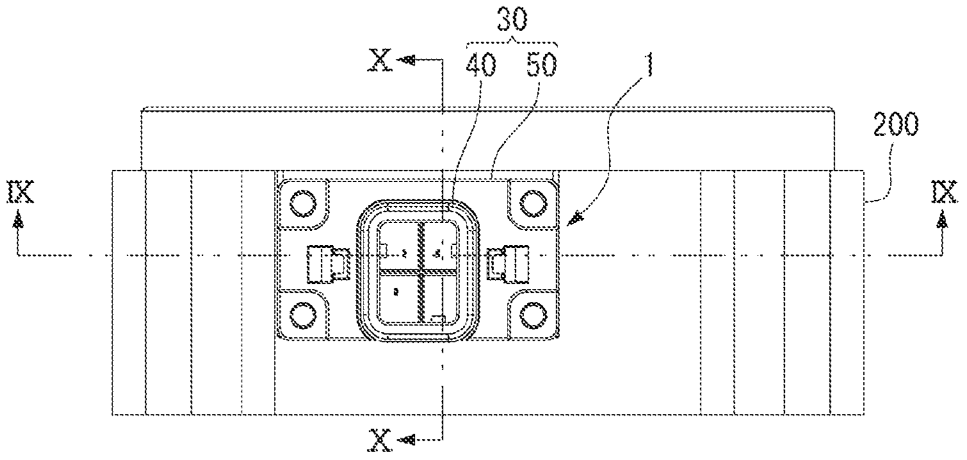
FIG. 8 is a top view illustrating the electrical connector mated to the mating connector.

The second contact 20 is illustrated in FIGS. 6, 9, and 10. Each second contact 20 is formed by subjecting an electrically conductive metal plate such as copper or copper alloy to stamping working and texture bending working.

The respective second contacts 20 are electrically connected to the third contacts 30 of the mating electrical connector 100, as illustrated in FIGS. 9 and 10.

As illustrated in FIG. 6, each of the second contacts 20 includes: a tab-type connecting end 21 connected to each third contact 30; and a first connection portion 22 of which the leading end is straight linked to the connecting end 21. Moreover, each of the first contacts 10 includes: a second connection portion 23 of which the leading end is linked orthogonally to the rear end of each first connection portion 22; a third connection portion 24 of which the leading end is linked orthogonally to the rear end of the second connection portion 23; and a fixation portion 25 that is disposed on the rear end of the third connection portion 24, fixed in the state of being housed in the connector housing 70, and connected to each first contact 10.

In various embodiments, the connecting end 21 and the first connection portion 22, which require thicknesses and strength, in each second contact 20 form a two-layer structure in which the electrically conductive metal plate is folded. The second connection portion 23, the third connection portion 24, and the fixation portion 25 except the connecting end 21 and the first connection portion 22 form an elastic portion 28 including a one-layer metal plate because of requiring elasticity rather than strength.

In various embodiments, each of the second contacts 20 includes an S-shaped bent region 29 over the first connection portion 22, the second connection portion 23, and the third connection portion 24. As a result, each second contact 20 can include elasticity with respect to the height direction Z particularly in the bent region.

The connection relationship between the first contact 10 and the second contact 20 is illustrated in FIGS. 5, 9, and 10. As illustrated in FIGS. 5, 9, and 10, the first contacts 10 and the second contacts 20 are electrically connected to each other by inserting the lower ends of the first contacts 10 in the figures into the fixation portions 25 of the second contacts 20.

As illustrated in FIG. 9, each second contact 20 is mated to each first contact 10 in the fixation portion 25 in one end of each second contact 20, and is fixed to the lower housing 60 in the fixation portion 25. A loose-fit portion 27 spaced from the lower housing 60 in each contact housing hole 64 is formed below the fixation portion 25 in the figure in each second contact 20.

The mating electrical connector 100 is illustrated in FIGS. 1, 9, and 10. The mating electrical connector 100 is disposed on the object to be applied 200, and connection between the electrical connector 1 and the mating electrical connector 100 allows a needed electrical signal to be provided to the object to be applied 200 through the electrical connector 1 and the mating electrical connector 100, as illustrated in FIGS. 1, 9, and 10.

The mating electrical connector 100 includes: the third contacts 30 that are electrically connected to the two respective second contacts 20 included in the electrical connector 1; and the mating housing 110 that retains the third contacts 30. The third contacts 30 form mating contacts that are electrically connected to the second contacts 20 of the electrical connector 1. As a result, the first contacts 10, the second contacts 20, and the third contacts 30 are electrically connected to each other.

The mating housing 110 is illustrated in FIGS. 1, 7, and 10. As illustrated in FIGS. 1 and 7, the mating housing 110 includes: contact housing chambers 111 in which the two respective third contacts 30 are housed and retained; and the first guide passage 113 and the second guide passage 115 that are disposed adjacently to the contact housing chambers 111 in the longitudinal direction X. The mating housing 110 includes four columnar-shaped partitions 114A, 114B, 114C, and 114D to form the first guide passage 113 and the second guide passage 115. As described above, the first element 65A of the first guide 65 is inserted and guided into the first guide passage 113, and the second element 65B of the first guide 65 is inserted and guided into the second guide passage 115.

In the mating housing 110, the third guide passage 117 is disposed across the contact housing chambers 111 from the first guide passage 113 and the like in the longitudinal direction X, as illustrated in FIGS. 1 and 7. The second guide 67 is inserted and guided into the third guide passage 117.

The first guide passage 113, the second guide passage 115, and the third guide passage 117 are formed to have the sizes of grooves depending on the guides inserted and guided into the passages. The opening sizes of the grooves are constant in the height direction Z.

As illustrated in FIGS. 1 and 7, two contact housing chambers 111 spaced in the crosswise direction Y are formed in the mating housing 110. As illustrated in FIG. 7(*d*), the reception openings 31 of the third contacts 30 are outwardly positioned in the contact housing chambers 111.

As illustrated in FIGS. 1 and 7(*a*), the partition 114A and the partition 114B are arrayed in a line in the crosswise direction Y at a predetermined spacing, and the partition 114C and the partition 114D are also arrayed in a line in the crosswise direction Y at a predetermined spacing. Moreover, the partition 114A and the partition 114C are arrayed in a line in the longitudinal direction X at a predetermined spacing, and the partition 114B and the partition 114D are also arrayed in a line in the longitudinal direction X at a predetermined spacing.

The partitions 114A, 114B, 114C, and 114D are arrayed as described above, whereby the first guide passage 113 is formed between the line of the partitions 114A and 114B and the line of the partitions 114C and 114D. Likewise, the second guide passage 115 is formed between the partition 114A and the partition 114B. The first guide passage 113 and the second guide passage 115 form a T shape in planar view.

The third contact 30 is illustrated in FIGS. 7, 9, and 10. The respective third contacts 30 are electrically connected to the second contacts 20 of the electrical connector 1, as illustrated in FIGS. 9 and 10.

The third contacts 30 is formed in a U shape by subjecting an electrically conductive metal plate such as copper or copper alloy to stamping working and bending working. As illustrated in FIGS. 7(*d*) and 10, each of the third contacts 30 includes: the female-type reception opening 31 that is mated to the connecting end 21 of each second contact 20; and an elastic support 32 that supports the reception opening 31.

The state of connection between the electrical connector 1 and the mating electrical connector 100 is illustrated in FIGS. 9 and 10. When the electrical connector 1 and the mating electrical connector 100 are in a normal connection state, the mating electrical connector 100 and a part of the electrical connector 1 connected to the mating electrical connector 100 are housed in the object to be applied 200, as illustrated in FIGS. 9 and 10. In the electrical connector 1, the lower housing 60 that is directly connected to the mating electrical connector 100, excluding a part of the upper portion of the lower housing 60, is housed in a connector housing portion 201, and the connection cylinder 47 of the upper housing 40 that is connected to the lower housing 60 is housed in the connector housing portion 201. The attachment flange 50 is mounted on the support table 203 of the object to be applied 200, and is located between the upper housing 40 and the lower housing 60.

As for the contacts, the first contacts 10 and the second contacts 20 are electrically connected to each other in the lower housing 60, and the second contacts 20 and the third contacts 30 are electrically connected to each other in the mating housing 110. Connection between the third contacts 30 and the electrical element of the object to be applied 200 is achieved. However, illustration of the connection is omitted.

Figure 11A:
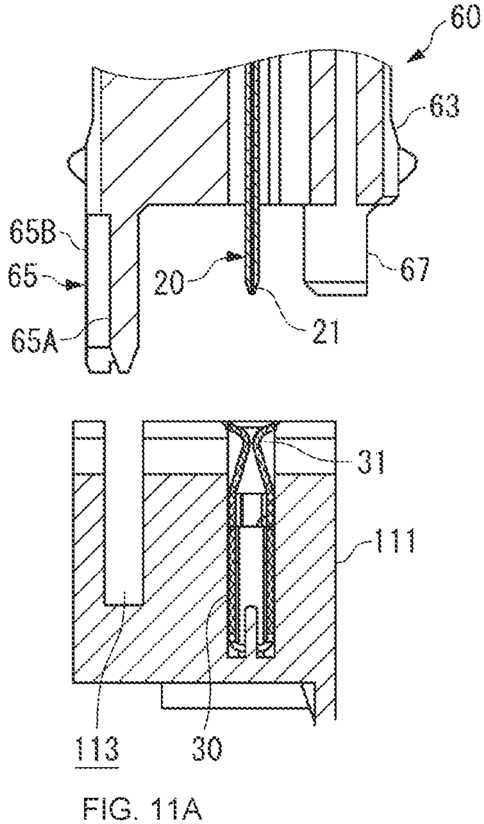
FIG. 11(*a*) is a partial cross sectional view illustrating the electrical connector poised for mating to the mating connector.
Figure 11B:
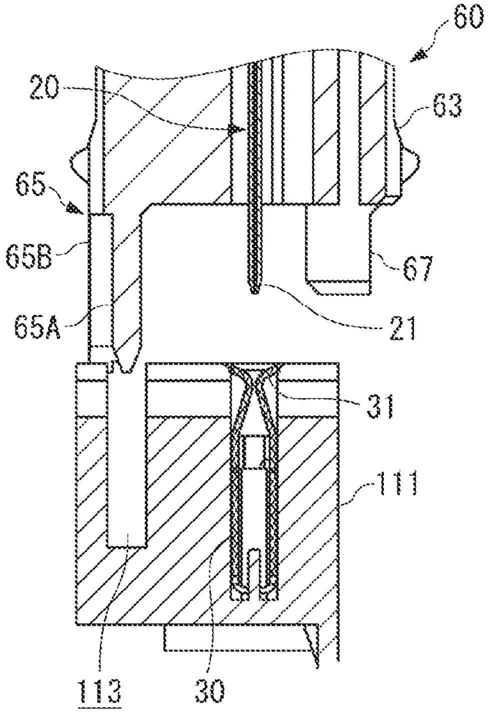
Figure 11C:
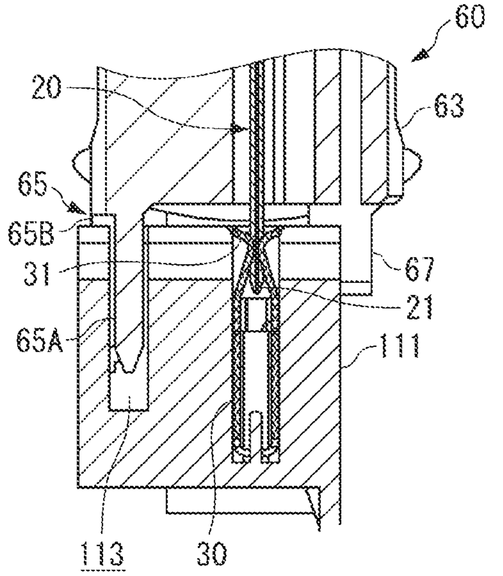

The mating procedure is illustrated in FIG. 11. Mating the connecting ends 21 and the reception openings 31 to each other is difficult and may result in damage to the contacts when a state in which relative alignment between the connecting ends 21 of the second contacts 20 and the reception openings 31 of the third contacts 30 is not accomplished. When the mating is intended to be performed in the state of positional deviations between the connecting ends 21 and the reception openings 31, the connecting ends 21 hit metal plates included in the reception openings 31, whereby the connecting end 21 may be prevented from being inserted into the reception openings 31, or damage such as buckling may be caused. For the purpose of preventing such positional deviations between the connecting ends 21 and the reception openings 31 from occurring, the lower housing 60 of the electrical connector 1 includes the first guide 65, and the mating housing 110 of the mating electrical connector 100 includes the first guide passage 113 and the second guide passage 115. A procedure of mating the connecting ends 21 and the reception openings 31 to each other with the first guide 65, the first guide passage 113, and the second guide passage 115 will be described below with reference to FIG. 11. Only areas required for explaining the lower housing 60 and the mating housing 110 are illustrated in FIG. 11.

As illustrated in FIG. 11(*a*), the lower housing 60 and the mating housing 110 are allowed to face each other. FIG. 11(*a*) describes that the first guide 65 and the first guide passage 113 are aligned with each other, and that the second contacts 20 and the third contacts 30 are aligned with each other. As a matter of course, however, a positional deviation may occur in the case of actual mating operation. Even so, in the illustrated embodiment, alignment between the second contacts 20 and the third contacts 30 can be accomplished, and mating between the second contacts 20 and the third contacts 30 can be achieved while maintaining the state of the alignment.

As illustrated in FIG. 11(*b*), the lower housing 60 is brought close to the mating housing 110. Since the first guide 65 extends below the second contacts 20, i.e., in a connection direction, the first element 65A of the first guide 65 is inserted into the first guide passage 113 prior to the second contacts 20. At this time, although not illustrated, the second element 65B of the first guide 65 is inserted into the second guide passage 115, and, from this point onward, a process similar to that of the first element 65A is also performed. Even if a positional deviation of the first element 65A with respect to the first guide passage 113 occurs, the first guide 65 and the first guide passage 113 can be aligned with each other by moving the first element 65A in a minute distance in one or both of the longitudinal direction X and the crosswise direction Y of the lower housing 60 and the mating housing 110.

As illustrated in FIG. 11(*b*), the second contacts 20 and the third contacts 30 are aligned with each other although the second contacts 20 are separate from the third contacts 30 at the point in time when the leading end of the first element 65A is inserted into the first guide passage 113. The first guide 65 is tapered down toward the leading end, and therefore, it is easy to align the first guide 65 and the first guide passage 113 with each other.

The size of a portion of the first guide 65, extending from the lower housing 60, is greater than the sizes of portions of the second contacts 20, extending from the lower housing 60. A minimum requirement for this is that the first guide 65 is inserted into the first guide passage 113 before the second contacts 20 comes in contact with the vicinities of the reception openings 31 of the third contacts 30.

Then, when the lower housing 60 is brought closer to the mating housing 110, the first element 65A of the first guide 65 is inserted into the deep recess of the first guide passage 113, and the connecting ends 21 of the second contacts 20 are inserted into the reception openings 31 of the third contacts 30, as illustrated in FIG. 11(*c*). During a period between the start of the guiding insertion in FIG. 11(*b*) and the completion of the guiding insertion in FIG. 11(*c*), the first guide 65 is moved while being guided in the first guide passage 113, and therefore, the second contacts 20 are mated to the third contacts 30 without occurrence of any position deviation of the second contacts 20 with respect to the third contacts 30.

The electrical connector 1 includes the first guide 65 of which the portion extending in the connection direction is longer than the portions of the second contacts 20 that are electrically connected to the third contacts 30 of the mating electrical connector 100. Accordingly, when the electrical connector 1 is connected to the mating electrical connector 100, the first guide 65 is guided into the first guide passage 113 and second guide passage 115 of the mating housing 110 prior to the second contacts 20, whereby then, the second contacts 20 aligned with respect to the third contacts 30 are smoothly inserted and mated into the third contacts 30.

In addition to the above explanations, it is possible to choose the configurations described in the above embodiment and to modify the configurations to other configurations as appropriate, without departing from the gist of the invention.

For example, in the above embodiment, the two guides of the first guide 65 and the second guide 67 that are guided in the different directions. However, the subject matter described herein is not limited thereto. For example, various embodiments encompass an aspect in which at least one of a guide corresponding to the longitudinal direction X and a guide corresponding to the crosswise direction Y is included.

In the above embodiment, the first guide 65 and the second guide 67 that are guided in the different directions are integrally formed. However, the first guide 65 and the second guide 67 may be separately formed.

In the above embodiment, the cross sectional shapes of the first guide 65 and the second guide 67 that are guided in the different directions may be rectangular shapes. However, other shapes, for example, polygonal shapes, such as circular shapes and triangular shapes, excluding rectangular shapes may be used in alternative embodiments.

In the above embodiment, the sizes, in the height direction Z, of the first guide 65 and the second guide 67 that are guided in the different directions may be equivalent. However, the sizes of the first guide 65 and the second guide 67 may be different in alternative embodiments, provided that the first guide 65 and the second guide 67 are longer than at least the second contacts 20.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing including a housing body having a housing hole, the housing body includes an end wall at a mating end of the housing configured to be mated with a mating electrical connector along a mating axis;

at least one contact that is housed in the housing hole in the housing body of the housing, the at least one contact extends in a predetermined direction from the end wall into an open space beyond the end wall, the at least one contact being a tab type contact including a two-layer connecting end that is mated to a receptacle-type mating contact in a mating side, and is formed by bending a metal plate and an elastic portion that is linked to the connecting end, and is formed of a one-layer metal plate, the elastic portion includes an S-shaped bent region; and a guide that is disposed contiguously to the housing body, the guide extends from the end wall into the open space beyond the end wall parallel to and spaced from the at least one contact such that the guide is configured to engage the mating electrical connector prior to the housing body engaging the mating electrical connector during mating, wherein a size of a portion of the guide, extending from the housing body, is greater than a size of a portion of the contact, extending from the housing body such that a distal end of the guide is located forward of a distal end of the at least one contact.

2. The electrical connector according to claim 1, wherein:

the guide includes a tapered tip portion and a body portion that is linked to the tip section, the guide has a constant cross sectional area; and a size of a portion of only the body portion, extending from the housing, is greater than the size of the portion of the contact, extending from the housing.

3. The electrical connector according to claim 1, wherein:

the housing has a crosswise direction and a longitudinal direction that are each orthogonal to the predetermined direction, and the guide comprises one or both of a longitudinal element that prevents a positional deviation in the longitudinal direction and a crosswise element that prevents a positional deviation in the crosswise direction.

4. The electrical connector according to claim 1, wherein the contact comprises:

a fixation portion that is housed in the housing;

a loose-fit portion that is positioned at a predetermined spacing from the housing, and the fixation portion is disposed in an end of the contact, opposite to the predetermined direction.

5. The electrical connector according to claim 1, wherein the at least one contact protrudes from the end wall of the housing body a first distance and wherein the guide protrudes from the end wall of the housing body a second distance greater than the first distance.

6. The electrical connector according to claim 1, wherein the guide is configured to locate the electrical connector relative to the mating electrical connector prior to the at least one contact or the housing body interfacing with the mating electrical connector.

7. The electrical connector according to claim 6, wherein the guide is configured to locate the electrical connector relative to the mating electrical connector in two mutually perpendicular directions.

8. The electrical connector according to claim 1, wherein the guide is T-shaped.

9. The electrical connector according to claim 1, wherein the first guide includes a first element formed to have a large width in a longitudinal direction and a second element disposed contiguously to a center of the first element in the longitudinal direction, the second element has a smaller width than the first element.

10. An electrical connector assembly comprising:

an electrical connector including a housing including a housing body having a housing hole, the housing body includes an end wall at a mating end of the housing, the electrical connector including at least one contact that is housed in the housing hole in the housing body of the housing, the at least one contact extends in a predetermined direction from the end wall into an open space beyond the end wall, the at least one contact being a tab type contact including a two-layer connecting end that is mated to a receptacle-type mating contact in a mating side, and is formed by bending a metal plate and an elastic portion that is linked to the connecting end, and is formed of a one-layer metal plate, the elastic portion includes an S-shaped bent region, the electrical connector includes a guide disposed contiguously to the housing body, the guide extends from the end wall into the open space beyond the end wall parallel to and spaced from the at least one contact, wherein a size of a portion of the guide, extending from the housing body, is greater than a size of a portion of the contact, extending from the housing body such that a distal end of the guide is located forward of a distal end of the at least one contact; and a mating electrical connector that is connected to the electrical connector along the mating axis, the mating electrical connector includes a mating contact that is electrically connected to the contact of the electrical connector and a mating housing that retains the mating contact, the mating housing includes a guide passage through which the guide of the electrical connector is guided;

wherein the guide is configured to engage the mating electrical connector prior to the housing body engaging the mating electrical connector during mating.

11. The electrical connector assembly according to claim 10, wherein:

the guide includes a tapered tip portion and a body portion that is linked to the tip section, the guide has a constant cross sectional area; and a size of a portion of only the body portion, extending from the housing, is greater than the size of the portion of the contact, extending from the housing.

12. The electrical connector assembly according to claim 10, wherein:

the housing has a crosswise direction and a longitudinal direction that are each orthogonal to the predetermined direction, and the guide comprises one or both of a longitudinal element that prevents a positional deviation in the longitudinal direction and a crosswise element that prevents a positional deviation in the crosswise direction.

13. The electrical connector assembly according to claim 10, wherein the contact comprises:

a fixation portion that is housed in the housing;

a loose-fit portion that is positioned at a predetermined spacing from the housing, and the fixation portion is disposed in an end of the contact, opposite to the predetermined direction.

14. The electrical connector assembly according to claim 10, wherein the at least one contact protrudes from the end wall of the housing body a first distance and wherein the guide protrudes from the end wall of the housing body a second distance greater than the first distance.

15. The electrical connector assembly according to claim 10, wherein the guide is configured to locate the electrical connector relative to the mating electrical connector prior to the at least one contact or the housing body interfacing with the mating electrical connector.

16. The electrical connector assembly according to claim 15, wherein the guide locates the electrical connector relative to the mating electrical connector in two mutually perpendicular directions.

17. The electrical connector assembly according to claim 10, wherein the guide is T-shaped.

18. The electrical connector assembly according to claim 10, wherein the first guide includes a first element formed to have a large width in a longitudinal direction and a second element disposed contiguously to a center of the first element in the longitudinal direction, the second element has a smaller width than the first element.

* * * * *